United States Patent

[11] 3,579,197

[72] Inventor Gary N. Stapleford
Nashua, N.H.
[21] Appl. No. 803,371
[22] Filed Feb. 28, 1969
[45] Patented May 18, 1971
[73] Assignee Sanders Associates, Inc.
Nashua, N.H.

[54] APPARATUS FOR PROGRAMMABLE CONTROL OF ELECTROMECHANICAL DEVICES
35 Claims, 13 Drawing Figs.

[52] U.S. Cl. .......... 340/172.5
[51] Int. Cl. .......... G06f 9/00
[50] Field of Search .......... 340/172.5; 235/157, 151.11

[56] References Cited
UNITED STATES PATENTS

| | | | |
|---|---|---|---|
| 3,283,308 | 11/1966 | Klein et al. .......... | 340/172.5 |
| 3,350,687 | 10/1967 | Gabrielson et al. .......... | 340/172.5X |
| 3,388,380 | 6/1968 | Coffin, Jr. et al. .......... | 340/172.5X |
| 3,393,300 | 7/1968 | Jennings et al. .......... | 340/172.5X |
| 3,425,038 | 1/1969 | Trousdale .......... | 340/172.5 |

*Primary Examiner*—Raulfe B. Zache
*Attorney*—Louis Etlinger

ABSTRACT: Instructions having a simple format are sued to control several classes of electromechanical devices such as slide projectors, tape recorders, movie projectors, X–Y positioning devices, etc. The instructions are stored in a recirculating memory and are monitored by a main controller. The main controller is coupled to one or more subcontrollers, each subcontroller being used to control one of the class devices. When the main controller is activated, an instruction is enabled into a designated subcontroller by means of the main controller. The instruction is then executed by the subcontroller. After execution, the apparatus is recycled by a signal from either of the subcontrollers. In addition, more than one subcontroller may be executing instruction words simultaneously, thereby allowing two or or more different class devices to be operating simultaneously. Furthermore, the apparatus may be used in conjunction with a display system, thereby allowing display of text associated with an instruction simultaneously with the execution of the instruction.

INVENTOR.
GARY N. STAPLEFORD
BY
ATTORNEY

INVENTOR.
GARY N. STAPLEFORD
BY
ATTORNEY

INVENTOR.
GARY N. STAPLEFORD
BY
ATTORNEY

INVENTOR.
GARY N. STAPLEFORD
BY [signature]
ATTORNEY

INVENTOR.
GARY N. STAPLEFORD
BY
ATTORNEY

INVENTOR.
GARY N. STAPLEFORD
BY
ATTORNEY

INVENTOR.
GARY N. STAPLEFORD
BY [signature]
ATTORNEY

APPARATUS FOR PROGRAMMABLE CONTROL OF ELECTROMECHANICAL DEVICES

BACKGROUND OF THE INVENTION

1. Field of the Invention

This invention relates to apparatus for programmable control of electromechanical devices. More particularly, it relates to apparatus comprised of a main controller and one or more device class subcontrollers which interpret a simple instruction format stored in a recirculating memory and executes the instruction while displaying text, if any, associated with that instruction.

2. Description of the Prior Art

In the prior art, electromechanical devices such as slide and movie projectors, tape recorders, etc. have been remotely controlled by on/off circuits, and the sequence of control has been limited to that order in which the slides were inserted in a slide tray or in the case of tape recorders or movie projectors to that order in which information on the tape or film was assembled. Under operator control, a presentation could then be made.

Also in the prior art, apparatus for the operation of more than one device synchronized with another device or devices utilized programming techniques which were not easily alterable. Such techniques included the insertion of tone signals on tapes or notches on projector film. Apparatus could then detect either the tone signals or notches, and thereby start or stop one device or another. In addition, such indicators were used to maintain synchronization between the devices. These techniques limited the programmability of operation since once a tone signal or notch indicator was inserted, it was not easily changed.

These shortcomings of the prior art, therefore, demonstrate the desirability of controlling electromechanical devices using random access, and easily programmable techniques with or without the use of a computer. In addition, and not shown in the prior art, is the desirability of combining this above-mentioned apparatus with a display device, which permits real time generation, editing, and execution of programs and allows the display of supplemental text without a computer in the system. Above all, for ease of operation, it is desirable to implement the above with a single, simple instruction format.

SUMMARY AND OBJECTS OF THE INVENTION

Accordingly, it is an object of this invention to provide an improved apparatus for programmable control of electromechanical devices.

Another object of this invention is to provide an electromechanical device controller which is programmable for random operational control.

Still another object of this invention is to provide an electromechanical device controller which can operate with a single, simple instruction format.

Yet another object of this invention is to provide an electromechanical device controller which is programmable, without the use of a computer.

A further object of this invention is to provide apparatus which can programmably control a plurality of electromechanical devices simultaneously.

A still further object of this invention is to provide apparatus which is programmable, and which can synchronously control a plurality of electromechanical devices simultaneously.

Yet a further object of this invention is to provide a programmable electromechanical device controller which is capable of being combined with a visual display system for operation on a real time basis.

Another object of this invention is to provide a programmable electromechanical device controller in combination with a visual display system, whereby real time generation, editing and execution of programs and display of supplemental text may be accomplished without the use of a computer.

Still another object of this invention is to provide an educational teaching system which may programmably control in real time a tape recorder, a slide projector, a movie projector, a perceptoscope and/or any other remotely controllable electromechanical device while simultaneously displaying text and/or instructions on a display screen.

The invention accordingly comprises the features of construction, combination of elements, and arrangement of parts which will be exemplified in the construction hereinafter set forth, and the scope of the invention will be indicated in the claims.

Briefly, the apparatus of the invention is comprised of a main controller, one or more subcontrollers and a recirculating memory. The function of the main controller is to monitor the recirculating memory, and upon receipt of an instruction, to route the instruction characters by means of position-coding information to a designated subcontroller. Special control characters are also detected by the main controller and are routed as designated by their particular function.

In addition, where a display system is additionally embodied in the apparatus of the invention, the main controller provides means for controlling the display of text and/or instructions on the display screen, as well as providing means for synchronizing the apparatus to the display system and memory.

The subcontrollers are used to directly interact with the electromechanical devices. Because of variations in the input/output and controls needed for each class of electromechanical devices, a subcontroller must be provided for each class of devices. These subcontrollers may operate simultaneously. Each subcontroller may connect to many electromechanical devices in the same class, but may operate only one electromechanical device at a time. Where more than one device of the same class need be operated simultaneously, an additional subcontroller for that class is required.

Typically, each subcontroller is arranged to accept instructions as to time for instruction, the operation start address, the operation stop address, speed information, and where required, the tape track number, direction of movement, etc. Each of these instruction indicators is processed in the subcontrollers upon receipt of an execution command, thereby operating its electromechanical device. After the processing is completed, the subcontroller generates a request for another instruction. The next instruction might be processed by any of the subcontrollers as designated in such next instruction.

The instruction has a single, simple instruction word format. The instruction "word" is divided into fields with character positions therebetween. These fields are preceded and followed by special control characters, thereby completing the instruction word. The instruction in each field is used to control different functions, may be easily changed for individual applications, and may be omitted where desired by inserting a special character, thereby saving memory space.

The memory, main controller, and subcontrollers may be combined with a display system whereby real time generation editing and execution of programs and display of supplemental text may be accomplished. The entire system need not be utilized with a computer, but may be so coupled, if desired, where access to a large data bank is required.

The system comprising the display and control apparatus of this invention is especially useful as an educational teaching system. This is so due to the ease of programming technique used; i.e., a single, simple instruction word is used. Also, instructions may be inserted or changed directly from the keyboard associated with the display system.

BRIEF DESCRIPTION OF THE DRAWINGS 4. foregoing and other objects, features and advantages of the invention will be apparent from the following, more particular, description of the preferred embodiment of the invention, as illustrated in the accompanying drawings, in which.

Figure 8:
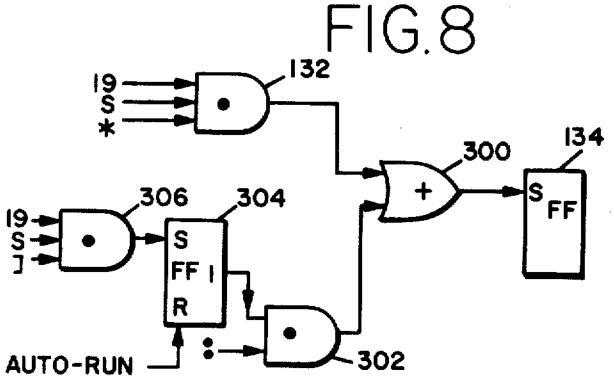
Figure 9:
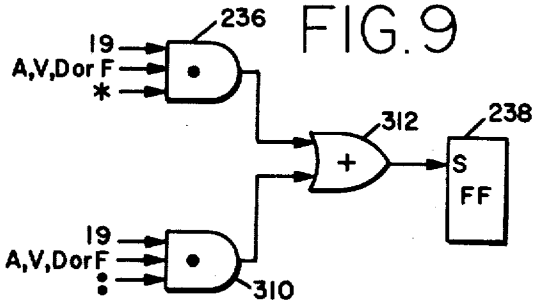
Figure 11:
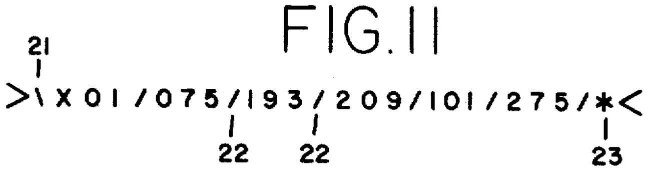
Figures 5, 5B:
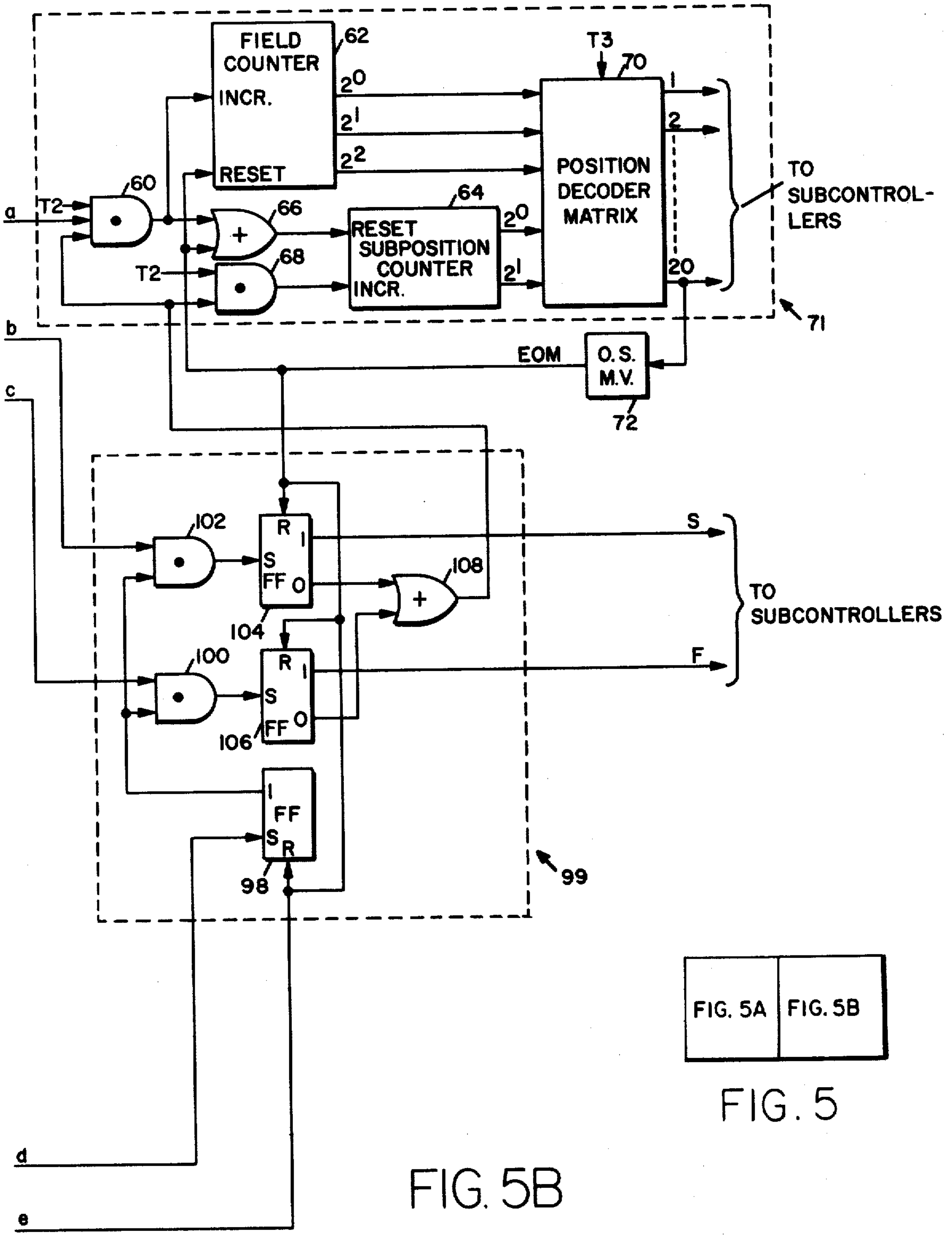
Figure 6:
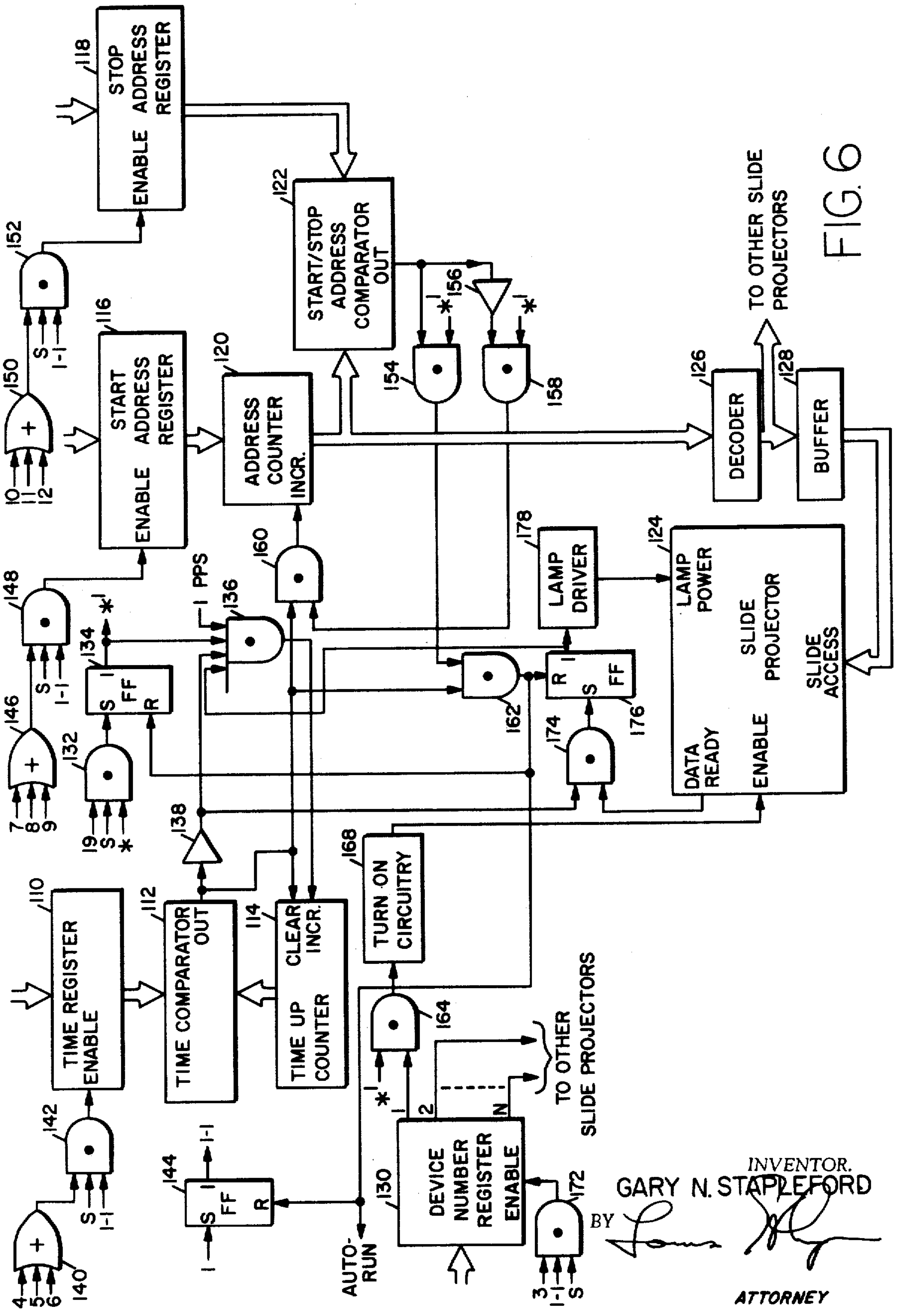
Figure 7:
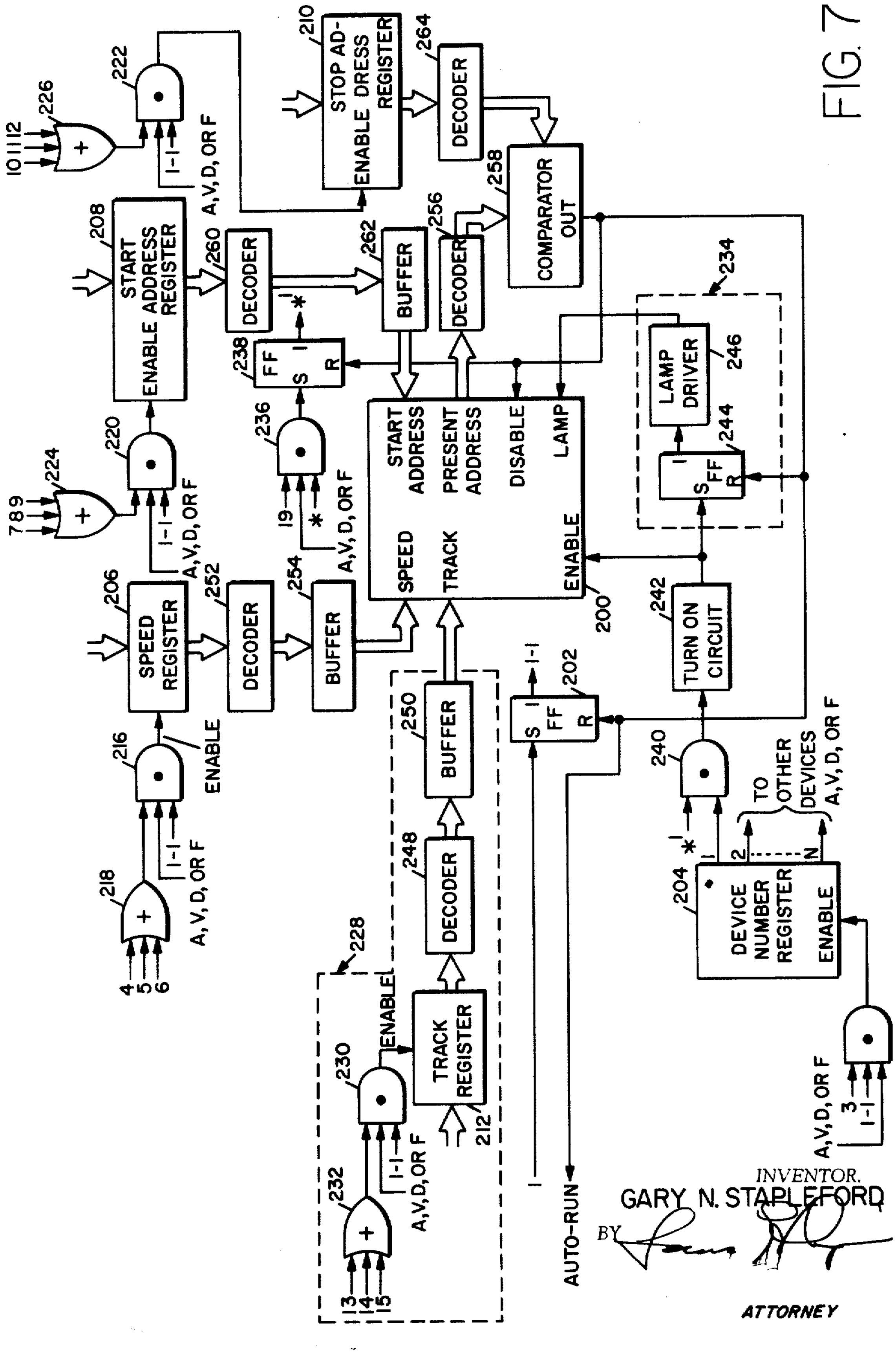
Figure 10:
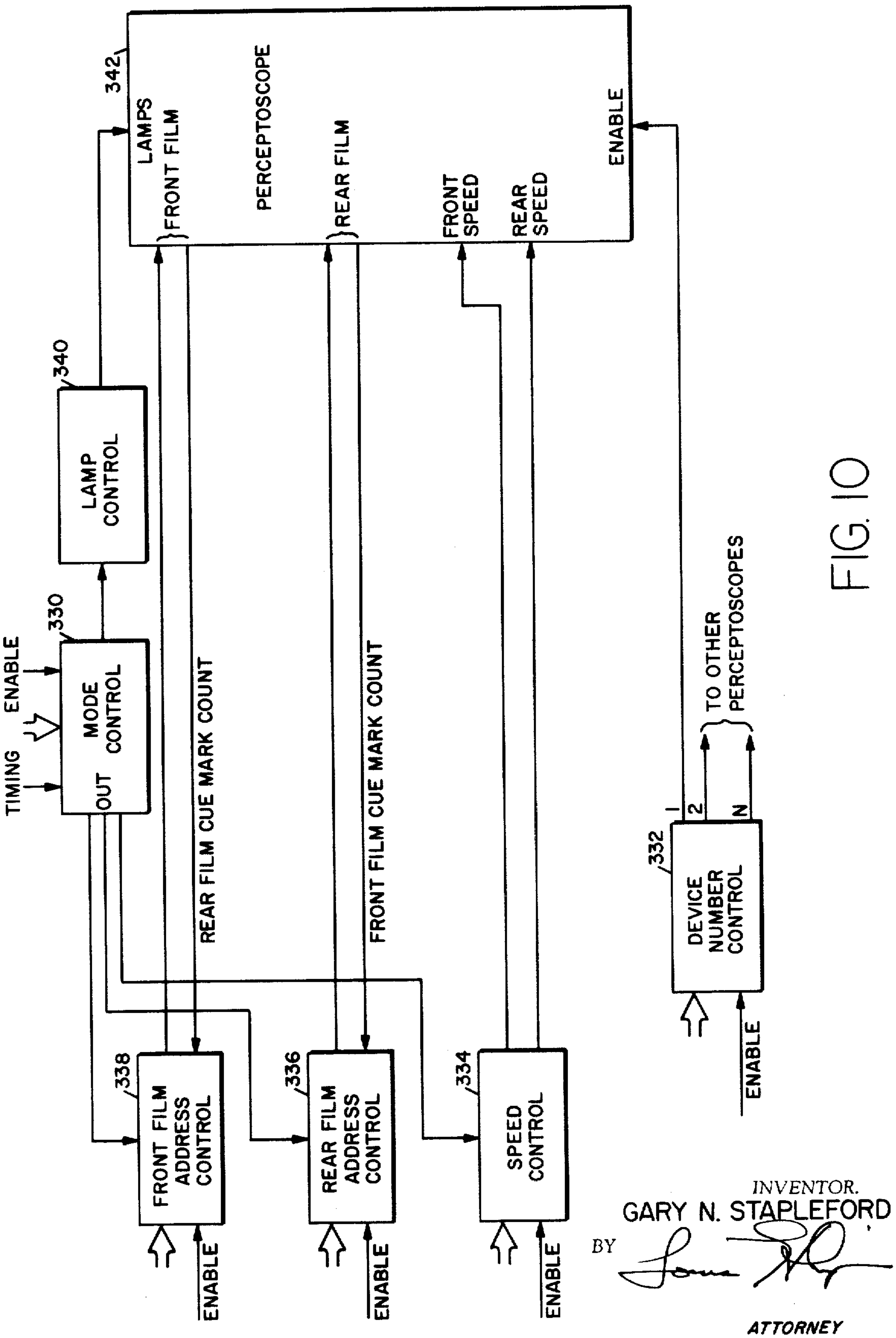

FIGS. 5—5B illustrate the schematic diagram of the main controller of the invention;

FIG. 6 is a schematic diagram of a subcontroller used to interact with a remotely controllable slide projector;

FIG. 7 is a schematic diagram of a subcontroller used to interact with a remotely controllable movie projector or tape recorder;

FIG. 8 illustrates logic used in combination with the subcontroller of FIG. 6 for simultaneous execution of more than one instruction word;

FIG. 9 illustrates logic used in combination with the subcontroller of FIG. 7 for simultaneous execution of more than one instruction word;

FIG. 10 is a schematic block diagram of a subcontroller used to interact with a remotely controllable perceptoscope; and FIG. 11 is an illustration of an instruction word used in the control of an X–Y positioning device.

DESCRIPTION OF THE PREFERRED EMBODIMENTS

Figure 1:
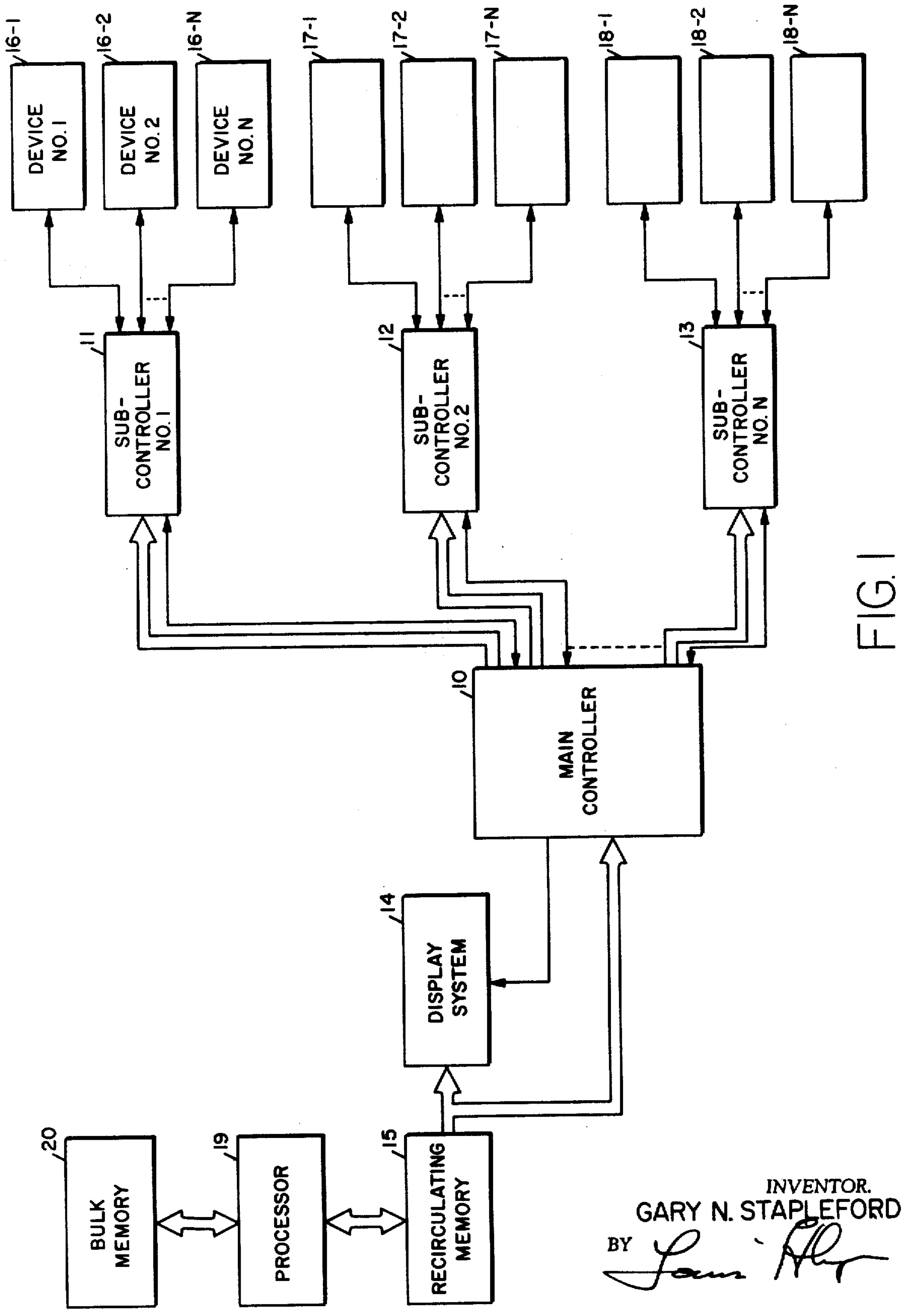
FIG. 1 is a schematic block diagram of the apparatus of this invention.

Now referring to FIG. 1, there is illustrated a general schematic block diagram of the apparatus embodying the invention. The apparatus is comprised of a main controller 10, a subcontroller 11 interacting with an electromechanical device or devices 16–1, 16–2,...16–N, and a recirculating memory 15. If desired, the total apparatus may be comprised of additional subcontrollers 12 and 13 connected to electromechanical devices 17 and 18, respectively.

Main controller 10 is coupled to recirculating memory 15 to receive information and instructions stored therein. The main controller 10 is also coupled to each of the subcontrollers for transfer of instructions thereto, which subcontrollers control their respective electromechanical devices. The main controller 10 is also capable of transferring information and the instructions to a display system 14 coupled thereto. A processor 19 and a bulk memory 20 may be coupled to memory 15 in order to provide access to a greater amount of information than can be stored in recirculating memory 15.

Subcontrollers 11, 12, and 13 each may control a separate class of electromechanical devices such as, but not limited to, slide projectors, tape recorders, movie projectors, perceptoscopes, X–Y coordinate positioning devices, etc. Because of the distinct interface requirements of each class device, the subcontrollers must in part be specially suited for the class of device it interacts with. These subcontrollers may be operating simultaneously to control different class devices; however, only one such class device may be controlled at a time by each subcontroller. If identical class devices must be operated simultaneously, then proportionally additional subcontrollers for that class device are required.

In operation, instruction words in the recirculating memory 15 are monitored by the main controller 10. Main controller 10 then routes the instruction word to the subcontroller designated, and develops position signals used to decode the characters in the instruction word. The subcontroller executes the instruction controllably interacting with one of its selected electromechanical devices. Information instructions in the instruction word comprise, but are not limited to, device class, time for instruction, start and stop addresses, speed track number, etc.

In addition, the apparatus of this invention may be combined with a display system 14 upon which the instruction words and supplemental text or information may be displayed as controlled by main controller 10 in response to special characters in the instruction word.

The total system, as indicated above, may be connected to a processor 19 and bulk memory 20. The processor 19 and memory 20 are not essential to the apparatus of this invention but when added give a system capable of several remote locations with the ability to draw on information and programming instructions from one bulk memory 20 via processor 19.

Now referring to FIG. 2, a typical instruction word used in the apparatus of this invention will be described. This single instruction format which will be described is sufficient to control all devices which are within the applicant's knowledge.

Firstly, each instruction has six parts or fields divided by field separators 22. Each field is comprised of three positions. Field 1 contains positions 1, 2 and 3 and so on until field 6 contains positions 16, 17 and 18. The slash symbols indicate either the start of the instruction or separation of the field. The backward slash 21 is the start of instruction indicator, while the forward slash 22, as mentioned above, is the field separator. The start of instruction indicator 21 is necessary before the subcontroller can be activated. Field one contains the indication of the device class. At position 1, this is indicated by S for slide projector, A for audio tape recorder, V for video tape recorder, F for movie projector, P for perceptoscope, D for digital recorder, or T for X–Y positioning devices, etc. This signal activates the type subcontroller required for the particular instruction. The use of position 2 is optional, but may indicate the direction of movement of the device under control; i.e., either forward or reverse. Interacting with each subcontroller may be a number of devices only one of which may be activated at a time. The device to be activated is indicated by position 3 of the instruction word.

Field 2 contains information pertaining to time of duration of the instruction. For example, in a slide projector, the time for display of a particular slide or a sequence of slides may be indicated. Minutes are indicated at position 4 and seconds at positions 5 and 6, so that a maximum time of 9 minutes and 59 seconds may be programmed into the system for each instruction word. For longer periods, the instruction may be repeated. Field 3 is used to indicate the start address of the device to be controlled. For example, if a slide projector is to be controlled, Field 3 will be a slide number; if a movie projector is to be controlled, it will be a frame number; and if a tape recorder is to be controlled, it will be the tape location. A maximum address of 999 may be indicated. Field 4, namely, positions 10, 11 and 12, is used to indicate a stop address for the device to be controlled. The comments above for start address apply generally for a stop address. The use of Field 5 is optional, but may be used, for example, in multiple track tape recorders, to indicate the track number. Field 6 is generally used to indicate the speed for variable speed projectors; however, Field 2 may be so used since an indication for time of operation would not be necessary. Although six fields are used in the instruction word, it should be appreciated that any number of fields may have been used. It should also be appreciated that the particular instructions in the fields described in FIG. 2 may be interchanged; i.e., Field 2 might have been used to indicate the start address, etc.

Other special characters in the instruction word are an execution command character (*) 23 which is located at position 19. The instruction word will not be executed in this system until the execution command 23 is received.

In addition, when a display system 14 is used with the apparatus of the invention, a character is required to control blanking and unblanking of the display screen in display system 14. Accordingly, a blank control character (>) 36 is used to prevent the instruction word from being displayed on the display screen. Blank control 36, where required, will be located before the start of instruction indicator 21. If it is desired that text appear on the display screen, an unblank control character (<) 24 may be located in position 20 of the instruction word. If it is desired that the instruction appear on the display screen, a blank control character 36 may be located before the start of instruction indicator 21. This unblank control 24 allows the text to be displayed on the display screen while the instruction word is blanked. This text will not be erased from the screen until the display is cleared by an input from the keyboard 47. If it is desired that the text following the instruction word be displayed only when that particular instruction word is being executed, then a conditional unblank character ([) 35 may be inserted at position 20. (See FIG. 3).

Figure 2:
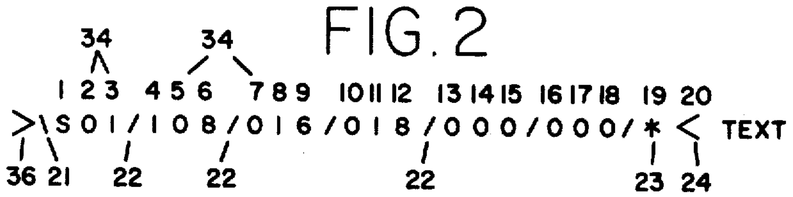
FIG. 2 is an illustration of a single instruction word.

Further explaining, the instruction word of FIG. 2 is interpreted as follows. The instruction word states that a subcontroller of class S (slide projector) will be activated, that device number 1 in class S will be activated, that slides 16 to 18 will be shown for 1 minute and 8 seconds each, and that only the text associated with the slides will be visible on the screen 50.

Figure 3:
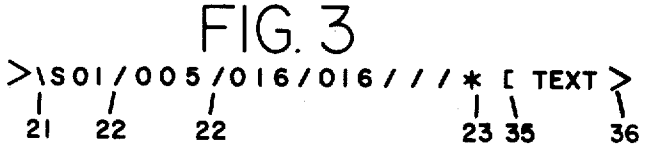
FIG. 3 is an illustration of a modified instruction word.

With reference now to FIG. 3, a modified instruction word is shown. Explaining, the S subcontroller and device number one will be activated, slide 16 will be shown for 5 seconds, and the text associated with this instruction word will be visible on the display screen 50 during the time that this instruction word is being executed (5 seconds).

In order to utilize memory spaces efficiently, the instruction word of FIG. 2 may be modified as shown in FIG. 3. Fields 5 and 6 of the FIG. 2 instruction word are not used in this example illustration, and this being so, zeros are indicated in positions 13 through 18. This single, simple-type format may be modified so that the zeros need not be used so that memory space can be saved. Therefore, a memory-saving feature of the apparatus is the ability to insert consecutive field separators 22, already in the format, thereby avoiding the zero insertion requirement. The main controller 10 includes means to recognize this omission and to accordingly generate the proper position indications.

Figure 4:
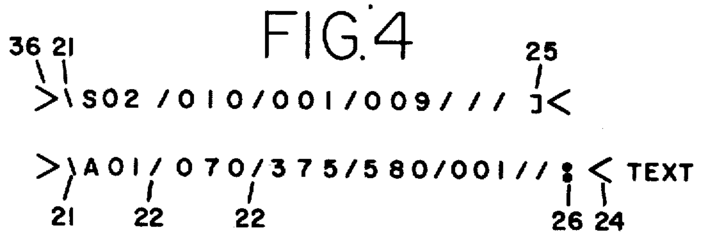
FIG. 4 is an illustration of two instruction words to be processed simultaneously.

Now referring to FIG. 4, there are illustrated two instruction words which are to be simultaneously executed. Two additional special instruction characters are required for this. The delay execution character (]) 25 is inserted in position 20 of the first instruction word, and is used to instruct the apparatus not to execute the preceding until the following instruction is ready for execution at the same time. The simultaneous execution character (:) 26 is inserted in position 20 of the second or last instruction word to be simultaneously executed, and is used to instruct the apparatus to execute this instruction and all preceding instructions not executed.

In explanation of the instructions of FIG. 4, the first instruction states that the slide projector subcontroller will be activated to operate device number two through slides one to nine, each slide shown for 10 seconds; and simultaneously as instructed by the second instruction operate the audio tape recorder subcontroller activating device number one at a speed of 7 inches per second between tape locations 375 to 580 on track number one.

It is understood that the above-mentioned instruction word formats may be extended to include other instruction indicators in the different fields of the instruction word. We will discuss briefly hereinafter the instruction words used specifically for a perceptoscope, an X–Y positioning table, and a branch subcontroller.

Figure 5A:
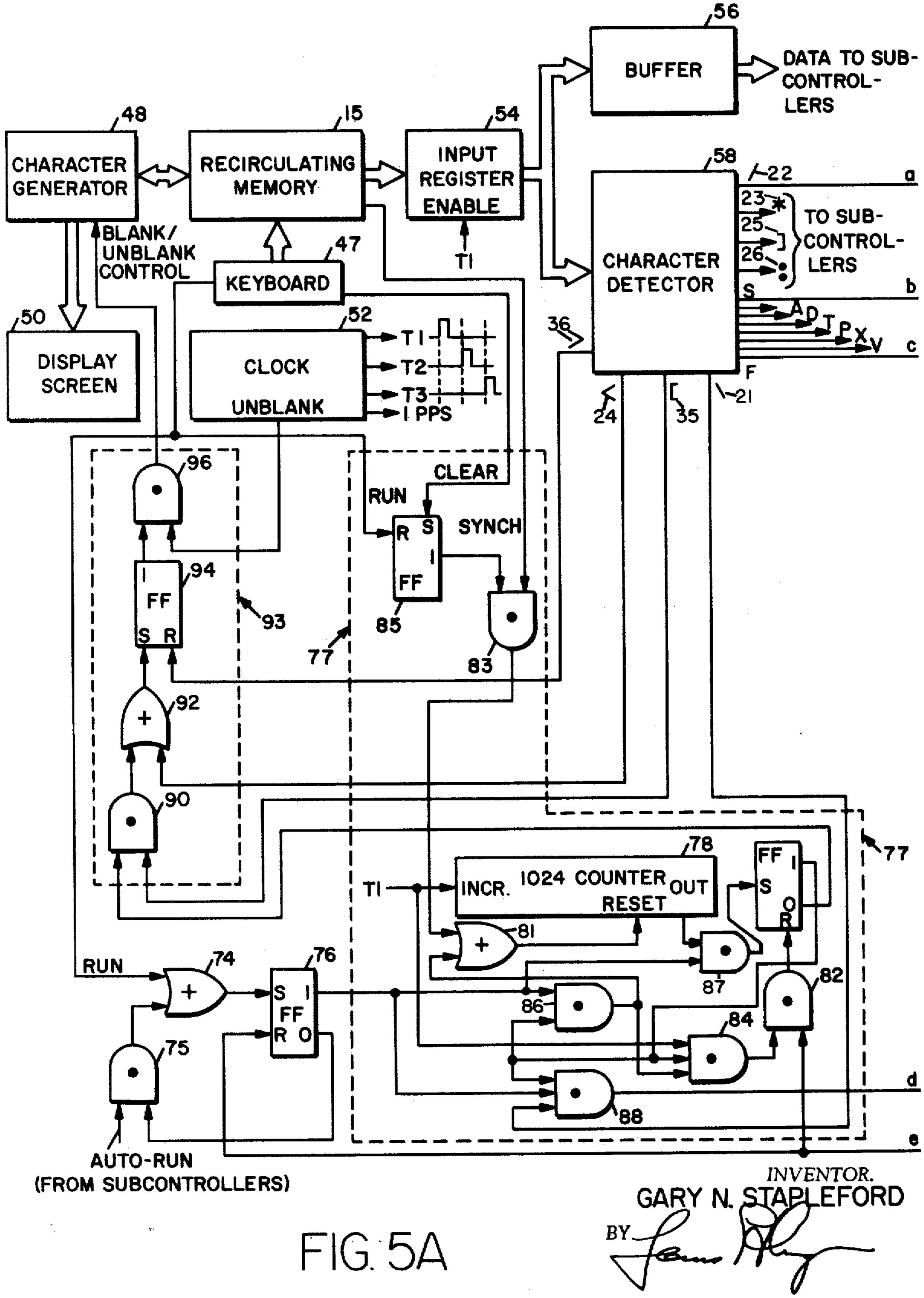

Now referring to FIGS. 5A and 5B, which are arranged according to the composite shown in FIG. 5, the main controller 10 of the invention is illustrated. Also illustrated in FIG. 5A is the display system 14 which includes a character generator 48 and associated electronics for presentation of characters on a display screen 50. Display system 14 might also include a clock 52, keyboard 47 and, in addition, the recirculating memory 15.

If a display system 14 is utilized with the apparatus of the invention, also included will be display blank/unblank control logic 93 for selectively controlling the display of characters on display screen 50 as instructed by the appropriate special characters in the instruction word. Additionally, display synchronizing logic 77 is utilized with the recirculating memory 15 and blank/unblank control logic 93 for keeping track of the instruction being operated on.

The output of memory 15 is connected to a character detector 58 via an input register 54. Note that all data paths are illustrated as double lines. Character detector 58 is used to recognize the various special control characters of the instruction word, and may be comprised of any logic such as comparators for implementing the identifying function. Position decoder logic 71 (FIG. 5B) is utilized in conjunction with detector 58 for decoding the individual character of the instruction word so that such character might be steered to the proper section of a connected subcontroller. Additionally, the main controller 10 includes subcontroller selection logic 99 utilized in combination with detector 58 for activating the subcontroller designated by the instruction word.

Still referring to FIGS. 5A and 5B, main controller 10 operates in the following manner. Recirculating memory 15, having been loaded by processor 19 (FIG. 1) or by keyboard 47 with instruction words and text material, will be monitored by main controller 10. An instruction word will be executed by main controller 10 and subcontroller 11; and associated text, if any, will be displayed on screen 50. Keyboard 47 is used to insert additional instructions into memory 15, and is also used to generate a Run command, which initiates operation of the main controller 10 as described later.

Clock 52 supplies successive timing pulses T1 and T2 and T3 as is illustrated in FIG. 5. Each of these pulses occurs in the time period for the execution of each character of the instruction word. Clock 52 also generates an additional pulse at the rate of one pulse per second, which pulse train is used where the device to be controlled requires time for operation information as, for example, in a slide projector. Clock 52 also generates unblanking signals which, if received by character generator 48, will be interpreted so that data will be visible on the screen 50. If the unblanking signal is inhibited by AND gate 96, the character generator 48 will interpret this as a blank control signal so that data will not be visible on screen 50.

The contents of memory 15 are constantly monitored, and when the RUN command is generated, the main controller 10 reads and executes via a subcontroller the selected instruction word contained in memory 15. Note that all instruction words are sequentially loaded into an input register 54, but are not used unless the proper strobe or timing signals are activated. More specifically, the main controller 10 will not accept an instruction word until a RUN or AUTO-RUN command is received at the inputs of OR gate 74. Register 54, connected to the output of memory 15, is enabled at time T1. The characters or data in input register 54 will then be transferred through a buffer 56 to one of the subcontrollers 11, 12 or 13, as designated by the instruction word. The data in input register 54, is in addition, sent to character detector 58. Character detector 58, for example, includes a comparator with AND gates connected and prewired in such a manner that on the occurrence of the special control characters such as blank control 36, start of instructions indicator 21, execution command 23, device-type indicator, field separator 22, unblank control 24 and 35, etc., will generate a pulse which will be routed to that location in the logic for control of the apparatus as will be described.

Now assuming that the operator has initially sent a RUN command to OR gate 74 via Keyboard 47, a flip-flop FF76 will be set. FF98 of the subcontroller selection logic 99 will become set in response to the RUN command and to the start of instruction indicator 21 via display synchronizing logic 77 as will be explained later. The one output of FF98 will partially condition AND gates 100 and 102. When, for example, the instruction word at position one indicates a slide projector S the character detector 58 will generate a pulse fully conditioning AND gate 102, which output will set FF104. A logical one level at the one output of FF104 will be sent to the S designated subcontroller, thereby enabling that particular subcontroller. At the same time, the logical one level on the zero output of FF106 will partially condition AND gate 68 in position decoder logic 71 via OR gate 108. Note that had the instruction word indicated the operation of a movie projector F, AND gate 100 would have been fully conditioned, thereby setting FF106 whose logical one output would be sent to the F designated subcontroller. AND gate 68 will be partially conditioned in the same manner as mentioned. Other electromechanical device subcontrollers would be activated in the same way.

On the occurrence of pulse T2, AND gate 68 will be fully conditioned, and will increment subposition counter 64 of position decoder logic 71 by one, thereby sending a signal on its $2^0$ line to position decoder matrix 70. Note that counter 64 is a common type capable of being incremented and reset. Position decoder matrix 70 may be a combination of AND gates and OR gates arranged to provide 20 outputs in response to the combinational outputs of subposition counter 64 and field counter 62. At time T3, matrix 70 will send a pulse on its one line to the subcontrollers 11, 12 and 13. The subcontroller activated will depend on the instruction word which generates such control by means of detector 58 and subcontroller selection logic 99.

In a similar manner, the instruction character at position 2 will be read into register 54 at time T1. At time T2, AND gate 68 will again be fully conditioned, incrementing counter 64. Counter 64 will send a pulse on its $2^1$ output line to matrix 70 which will interpret this input as the second position and upon being enabled by the occurrence of T3, transfer from its output a pulse on its number 2 line indicative of position 2 in the instruction word. The same operation is true for position 3. The next character of the instruction word is the first field separator 22, which will be decoded by detector 58, thereby generating a pulse which will be sent to one input of AND gate 60 in position decoder logic 71. The output of OR gate 108, remaining a logical one; when T2 occurs, AND gate 60 will be fully conditioned, thereby resetting counter 64 via OR gate 66 and incrementing field counter 62 by one so that a pulse will appear on the $2^0$ output line of field counter 62. Position decoder matrix 70 is provided so that it will be incremented by one, if subposition counter 64 is incremented by one. However, matrix 70 will not be incremented by field counter 62 until two successive field separator characters 22 are decoded by character detector 58 and field counter 62 is incremented twice in succession without intervening subposition counts. When the second successive field separator counter is indicated, position decoder matrix 70 will be incremented by three so that, in this example, now referring to FIG. 3, after position 12, matrix 70 will be incremented to position 15 and then to position 18 by the three successive field separator characters 22.

Now referring to FIG. 2 and FIGS. 5A and 5B, the occurrence of another indicator at position 4 will increment matrix 70 so that a pulse will occur on the number 4 output line. This process will be continued until the execution command 23 is decoded by character decoder 58 at which time this command will be sent directly to the designated subcontroller, and in addition, will be indicated as a position in subposition counter 64, thereby producing a pulse on the number 18 pulse output line of matrix 70. When the unconditional unblank signal 24 in FIG. 2 or the conditional unblank character signal 35 shown in FIG. 3 are decoded, matrix 70 will produce a pulse on its number 20 output line which will generate a pulse of longer duration via one shot multivibrator 72. This pulse is designated End of Word (EOM). The EOM pulse will reset field counter 62 and subposition counter 64, and will also reset device flip-flops 104, 106 and 98. The EOM pulse will additionally reset the display-synchronizing logic 77 to be presently discussed.

The display-synchronizing logic 77 includes a counter 78; FF76, FF80 and FF85; AND gates 82, 83, 84, 86, 87 and 88 and OR gate 81. The purpose of this synchronizing logic 77 is to synchronize the main controller 10 with the recirculating memory 15 in order to keep track of the instruction word being executed. More specifically, display-synchronizing logic 77 must provide the apparatus of the invention with the three following functions, namely: (1) synchronization with the first absolute position in the recirculating memory 15; (2) marking of the last character of the instruction word presently being executed so that the next sequential instruction word will be executed; and (3) controlling the conditional unblanking of display screen 50 so that text associated with the instruction word being executed will be visible.

If a display system 14 has the capability of displaying 1,024 characters on display screen 50, then recirculating memory 15 will also be capable of storing 1,024 characters. Recirculating memory 15 must have an absolute reference position to which the characters displayed are synchronized and to which synchronizing logic 77 must also be synchronized. Accordingly, a counter 78 is provided to count 1,024 characters. Timing pulse T1 is used to increment counter 78, since T1 occurs each time a character is enabled into register 54. The counter 78 will not output a pulse until it has counted 1,024 pulses T1. Also, counter 78 may be reset and held in that condition.

The absolute reference position in memory 15 is indicated as the SYNCH input to AND gate 83. When the operator starts the system, he initially clears the system via keyboard 47 at which time FF85 is set. With FF85 set, and upon receipt of a SYNCH pulse from recirculating memory 15, AND gate 83 will be fully conditioned, thereby clearing or resetting counter 78 via OR gate 81. Thereafter, counter 78 will present a pulse at its output every 1,024th occurrence of timing pulse T1 until a RUN signal is generated via keyboard 47. The RUN signal will reset FF85, thereby deactivating any further direct synchronization from the SYNCH pulse.

The RUN signal will also set FF76 via OR gate 74. The one output of FF76 will fully condition AND gate 87 when the counter 78 again reaches the count of 1,024. At this point, FF80 will be set to fully condition AND gate 86 whose output will reset and hold reset the count of counter 78. When the first start of instruction character 21 is detected by detector 58, AND gate 88 will be fully conditioned, since the other two inputs of AND gate 88 are also set. The output of AND gate 88 will activate subcontroller selection logic 99 via FF98. Thus, the first instruction word after the absolute reference position in recirculating memory 15 will be enabled into input register 54 of main controller 10 and via buffer 56 will be routed into the appropriate subcontroller, as will be discussed later.

Upon the occurrence of the last character of the first instruction word, matrix 70 will generate an EOM signal via one shot multivibrator 72. The EOM signal will be coincident with position 20 of the instruction word, and will reset FF76. The EOM signal will also reset FF80 via AND gate 82 whose other input, the output of AND gate 84, will be a logical one each time T1 occurs. At this point, counter 78 will be allowed to count again. Also, the zero output of FF80 will now be a logical one, thereby partially conditioning AND gate 90 in display blank/unblank logic 93. If the instruction word has a conditional unblank character 35 in position 20, AND gate 90 will then become fully conditioned, setting FF94 via OR gate 92 and causing the TEXT (see FIG. 3) to be visible on display screen 50 via control of AND gate 96 and character generator 48, as will be described more fully later. When the blank character 36 is detected, FF94 will be reset, blanking display screen 50.

Thus, the text associated with the first instruction word after the absolute reference position in memory 15 will be displayed while the first instruction word is being executed. The counter 78 is now counting from the last character in the first instruction word a total of 1,024 timing pulses T1 so that upon receipt of a RUN or AUTO-RUN signal, the next, i.e., the second instruction word in memory 15 will be loaded into a designated subcontroller via main controller 10. That is, once RUN or AUTO-RUN is received, AND gate 87 will be partially conditioned, and will be fully conditioned when counter 78 has reached the count of 1,024. The next start of instruction character 21 will fully condition AND gate 88, activating subcontroller selection logic 99 as was discussed before.

Display blank/unblank control logic 93 is controlled by special characters decoded by character detector 58. These special characters, as previously mentioned, are the unconditional blank character 36, the unconditional unblank character 24 and the conditional unblank character 35. Clock 52 generates an unblank control signal which if not inhibited will cause display screen 50 to display all input characters to it from memory 15 via character generator 48. If an unblank character 24 is received by display blank/unblank control logic 93, it will pass through OR gate 92 setting FF94, thereby fully conditioning AND gate 96 with the occurrence of the unblank signal from clock 52. The logical one level of the output of AND gate 96 will be interpreted as an unblank condition by character generator 48. If a blank character 36 is received, FF94 will be reset, thereby preventing AND gate 96 from being fully conditioned. The output of AND gate 96 will be a logical zero, and will be interpreted by character generator 48 as a blank condition. When the conditional unblank character 35 is received, this will partially condition AND gate 90. If the output of FF80 in synchronizing logic 77 is a logical one, AND gate 90 will be fully conditioned and the display will be unblanked in the same manner as the unblank character 24 unblanked the screen 50. Note, however, that the conditional unblank character 35 is used to unblank that which follows when executing the particular instruction. Accordingly, since FF80 is reset at the end of the instruction word as indicated by EOM AND gate 90 is fully conditioned by the zero output of FF80 and the conditional unblank character 35. Thus, while the instruction is being executed, the text as shown in FIG. 3 is visible on the display screen 50.

When EOM has occurred, resetting FF76, and while the subcontroller which has received the instruction word is executing it, the main controller 10 is free to receive and execute another instruction word with another subcontroller if the instruction word being executed does not have TEXT associated with it. Otherwise, another instruction word cannot be operated upon until the previous instruction word is fully executed by the subcontroller. Thus, EOM will partially condition AND gate 75 allowing a request from another subcontroller or the same subcontroller to initiate an AUTO-RUN command and recycle the main controller 10. In effect then, because the time for transfer of an instruction word from the memory 15 to a designated subcontroller is in microseconds, more than one subcontroller may be effectively operating simultaneously.

It will thus be seen from the above and following discussion that the main controller 10 may be used to drive a multiple of subcontrollers each subcontroller being arranged to drive a multiple of electromechanical devices in each particular class. These classes as has been discussed above may include slide projectors, tape recorders, etc. The following discussion will describe a typical subcontroller which is used to drive a slide projector.

Now referring to FIG. 6, position pulse number one from matrix 70 (FIG. 5B) sets flip-flop 144 to produce a pulse 1—1. The 1—1 pulse and the S output indication of FF104 (FIG. 5B) partially conditions AND gates 142, 148, 152 and 172. The double line data paths into the registers are from buffer 56 of main controller 10. This data is steered into the slide projector subcontroller in the following manner. The device number is stored in register 130 when position pulse three fully conditions AND gate 172. In a similar manner, and assuming the organization of the instruction word as indicated in FIG. 2, when position pulses 4, 5 or 6 fully condition AND gate 142 via OR gate 140, the time data is stored in register 110. On the occurrence of position pulses 7, 8 and 9 at the inputs of OR gate 146, AND gate 148 will be fully conditioned enabling the storing of the start address into register 116. On the occurrence of pulses 10, 11 and 12 OR gate 150 will present a pulse to AND gate 152 which now being fully conditioned will enable the stop address to be stored in register 118. Note that positions 13 to 18 of the instruction word are not used here. Upon the occurrence of position pulse 19 and the execute command character 23, AND gate 132 will be fully conditioned, thereby setting FF134.

The occurrence of the execute character 23 will activate the subcontroller so that the instruction word will be executed. Now explaining the execution of the time instruction, the time comparator 112 will output a pulse when the contents of register 110 and the count of the time-up counter 114 are equivalent. The time-up counter 114 is initially set to zero. If, for instance, the time to display each slide is 5 seconds, then counter 114 will have to be incremented by the output of AND gate 136 a total of five times. Further explaining, the output of FF134 will partially condition AND gate 136. The output of inverting amplifier 138 being a logical one when there is no time comparison in comparator 112, AND gate 136 will be fully conditioned each time the clock 52 presents a 1 pulse per second signal to the input of AND gate 136 and accordingly, time-up counter 114 will be incremented. When the contents of time register 110 are equal to the contents of time-up counter 114, the output of comparator 112, in this example after 5 seconds, will become a logical one, thereby clearing the time-up counter 114 to zero and unconditioning AND gate 136.

Referring now to the start and stop address commands, a start address now in register 116 will be loaded into address counter 120 whose output will be sent to start/stop comparator 122. The other input of comparator 122 is the stop address contained in register 118. If the contents of address counter 120 and register 118 are the same, the output of comparator 122 will be a logical one. If a logical one is present, AND gate 154 will be fully conditioned, since its other input is a logical one from FF134. The pulse on the output of AND gate 154 will partially condition AND gate 162 which will be fully conditioned by the output of comparator 112 when the contents of register 110 and counter 114 are equal. This being the case, the output of AND gate 162 will send a pulse called AUTO-RUN back to the main controller 10, as well as reset FF134, 144 and 176. The subcontroller 11 will now be ready to execute another instruction word.

However, if the contents of address counter 120 and stop address register 118 are not the same, the comparator 122 output will be a logical zero and will, with the one output (*') of FF134 fully condition AND gate 158 via inverting amplifier 156. The pulse at the output of AND gate 158 will partially condition AND gate 160, which is fully conditioned by the output pulse generated by comparator 112 when the contents of register 110 and counter 114 are equivalent. The output of AND gate 160 will increment address counter 120. The process of comparing the contents of address counter 120 and stop address register 118 will be repeated until AND gate 154 is fully conditioned, thereby generating the AUTO-RUN signal.

The output of address counter 120 will also be sent to decoder 126 which generates a code adapted to the selected slide projector 124. Drive and buffering will be provided by buffer 128 which is connected to the output of decoder 126. The output of buffer 128 is connected to all of the devices in this type class; namely, slide projectors.

Enabling and control of slide projector 124 controls such as lamp power and slide change will now be described. The device number register 130 having stored the device number selected, AND gate 164 will be fully conditioned by FF134 and, in this example, the device one output of register 130. The other outputs of register 130 are connected to the other slide projectors used in the system. The output of AND gate 164 will energize the turn on circuits 168 whose output will enable (give necessary AC power) slide projector 124. During the time that the output of time counter 112 is a logical zero that is where there is no comparison, AND gate 174 will be partially conditioned by the output of inverting amplifier 138. The other input to AND gate 174 is connected to the data-ready line of projector 124. Thus, when the slide number is indicated to projector 124 at the slide access input and after this slide is moved into position, the data-ready line will be energized fully conditioning AND gate 174 thereby setting FF176. The output of FF176 will energize lamp driver 178 thereby supplying lamp power to slide projector 124. The lamp will be shut off between instructions by the resetting of FF176 upon the occurrence of the AUTO-RUN signal. The lamp however could remain on even while changing slides if desired, by bypassing AND gate 174. As hereinbefore stated, the AUTO-RUN signal will ready the main and subcontroller for execution of the next instruction word.

Having described the operation of a remotely controllable slide projector by the controllers of the invention, it can readily be seen that the main controller and a modified subcontroller may be utilized to control the operation of a remotely controllable movie projector or tape recorder. The apparatus for such control will now be generally discussed keeping in mind the operation of the slide projector just discussed.

Now referring to FIG. 7, there is illustrated a subcontroller which might be used in combination with the main controller 10 and a suitable memory 15 to control the operation of an audio tape recorder A, a video tape recorder V, a digital recorder D or a movie projector F any one of which is indicated by device 200. Each of these devices requires speed information, start and stop address indicators and the device number of the particular class. Accordingly, this information in the fields of the instruction word is loaded into the appropriate registers by corresponding strobe or position signals in the same manner as was described for the slide projector subcontroller.

More specifically, a position one pulse from the position decoder matrix 70 (FIG. 5B) of main controller 10 will set FF202, whose output signal 1—1 will partially condition the enable inputs of registers 204, 206, 208, 210, and 212. The class select indicator A, V, D or F will also partially condition the enable input of these registers by their respective AND gates. Device number register 204 will be fully enabled via AND gate 214 when the position three pulse occurs. Speed register 206 will be fully enabled via AND gate 216 and OR gate 218 when position pulses 4 to 6 occur. Likewise start register 208 and stop register 210 will be fully enabled via their AND gates 220 and 222 and their OR gates 224 and 226 when position pulses 7 to 9 and 10 and 12 occur respectively.

If the device under control has more than one track, i.e., a multiple track tape recorder, then register 212 in track section 228 will be employed. Track register 212 will be additionally enabled on the occurrence of position pulses 13 to 15 via AND gate 230 and OR gate 232. If the device under control requires a lamp, i.e., a movie projector, lamp section 234 will be used.

In operation, the execution command indicator (*) and position pulse 19 will condition AND gate 236 and set FF238 to give an output (*′). The output of FF238 and the device number from register 204 (device number one illustrated) will then condition AND gate 240 to energize turn on circuit 242 thereby enabling device 200. If the device under control is a movie projector, lamp section 234 will be incorporated so that FF244 will be set energizing lamp devices 246 and turning on the lamp of device 200.

With the device 200 enabled, the track number, where required, will be selected by means of register 212, decoder 248 and buffer 250. Decoders and buffers are shown in combination with each register in order to provide the necessary code, power drive and circuit isolation where required. The speed will also be selected in device 200 by means of register 206, decoder 252 and buffer 259. In all of these cases where we steer the device to a particular speed, track, address, etc. we should note again that the device under control must be capable of remote operation and that a digital input with the necessary coding and drive will enable the device to set itself to the particular speed, track, address, etc.

Utilizing a device which supplies its present address in some manner, such as by a cue mark, tone signals, notches, revolution indicator, etc.; device 10 will transfer via decoder 256 its present address to comparator 258. With the device 200 enabled and the device at its designated start address as specified by register 208 via its decoder 260 and buffer 262, the tape reel or movie reel will revolve at the speed selected. Comparator 258 will compare the present address with that of the stop address supplied by register 210 via decoder 264 until both of its inputs are equal at which time the output of comparator 258 will be a logical one level. When the start and stop address are so equal, this will cause this subcontroller to be deactivated. Specifically the logical one at the output of comparator 258 will disable device 200; reset FF238, FF202, and FF244 (when required); and send an AUTO-RUN pulse back to main controller 10 indicating completion of the execution of an instruction word and requesting further instructions.

It has thus been seen that any remotely programmable type of recorder or movie projector may be controlled utilizing the subcontroller discussed immediately above. Also, a slide projector may be controlled utilizing a subcontroller discussed in relation to FIG. 6. It can be seen that both of these subcontrollers may be effectively operated simultaneously by following one instruction word designated for one subcontroller, by another instruction word designated for a second subcontroller. Delay time between the two instructive words would be so small that the two subcontrollers would appear to be operating simultaneously. However, when precise synchronization is required and for a single text must be displayed while operating two different types of class devices, operation of the subcontrollers must be provided as discussed in relation to FIG. 4.

FIG. 4 illustrates two special characters used when executing two instruction words simultaneously. They are the delay execution character (]) 25 and the simultaneous execution character (:) 26. Both characters will be decoded by character detector 58 of main controller 10. Both characters will also replace execution command character (*) 23; character 25 being used with the first instruction word and character 26 with the second instruction word. Now referring to FIG. 8, and assuming that the first instruction word designates a slide projector as designated by S in position one of the first instruction word of FIG. 4, FF134 will be set only after special execution character 26 has occurred. AND gate 306 will be fully conditioned by the occurrence of the position one pulse, the S select level and the delay execution character, thereby setting FF304. When the simultaneous execution character occurs, and with the output of FF304 AND gate 302 will be fully conditioned setting FF134 via OR gate 300. AND gate 132 will not be fully conditioned here. AUTO-RUN will reset FF304.

Also, now referring to FIG. 9, the simultaneous execution character will set FF238 of the subcontroller illustrated in FIG. 7. The simultaneous execution character, the device class level (A, V, D or F; FIG. 4 illustrates class A), and the position pulse 19 will fully condition AND gate 310 whose output will set FF238 via OR gate 312. Note that AND gate 310 could have been replaced by a similar logic arrangement as shown by logic elements 302, 304 and 306 of FIG. 8. This is so because the position pulses and certain special characters are connected to each subcontroller regardless of the one activated. Accordingly, the first instruction word could have designated class A while the second could have designated class S with no change in the execution of the instruction words.

The apparatus of the invention may also control a device called a perceptoscope. A simple explanation of a perceptoscope is the following. The perceptoscope employs two, superimposed 1b mm. films, either or both of which may be moved a single frame at a time or at any one of 18 selectable frame rates between one and 24 frames per second in either a forward or reverse direction. In addition, cue marks indicative of the present address on the film may be used for further control. Cue marks on the front film cause film motion to stop. Cue marks on the rear film cause the front film to move in frame synchronism with the rear film. The front film capacity is 400 feet, reel to reel, while the rear film is a continuous loop with an approximate maximum capacity of 6 feet. In most applications, the front film only is used in a motion picture mode, while the rear film is placed on a clear frame or one which contains overlay information for a motion picture sequence on the front film.

A perceptoscope controller should be capable of eight modes of operation:

Mode 0—Front film stepped, rear film fixed

The front film sequences through consecutive frames, in a forward direction, holding each frame for a specified time, from one-tenth of a second minumum to 59.9 seconds maximum. The number and location of frames in the consecutive sequence are controlled by specification of the start and stop front film cue marks. The rear film is positioned and held on a single, cue-marked frame during the entire sequence. The rear film frame is specified by its cue mark number.

Mode 1—Rear film stepped, front film fixed

This mode is the inverse of Mode 0—i.e., the rear film sequences in a forward direction while the front film remains on one frame. The time per frame and the number and location of frames in the sequence on the rear film are specified as for the front film in Mode 0, while the front film frame is specified as in Mode 0, rear film.

Mode 2—Rear film in continuous motion, front film stepped one frame for each rear film cue mark.

The rear film moves continuously, in a forward direction, at a specified speed (from 1 frame per second minimum to 24 frames per second maximum) starting at a specified cue mark number. The front film moves one frame, in the same direction as the rear film, for each cue mark on the rear film. The process terminates when the specified front film cue mark number is reached. Front and rear film start cue numbers and the front film stop cue numbers are specified to control the length and location of the sequence.

Mode 3—Front film in continuous motion, rear film fixed.

This is the motion picture mode. The front film moves continuously, in a forward direction, at the specified speed (1 to 24 frames per second), while the rear film remains stationary on one frame. Front and rear film start cue marks and front film stop cue marks numbers are specified to control the length and location of the sequence.

Modes 4 through 7 inclusive operate as Modes 0 through 3, respectively, with the exception that the film moves in a reverse direction.

The data or information contained in each field of the instruction word typically shown in FIG. 2 is modified as follows:

Field No. 1. Device Selection and Mode

First Character = Device (F = Perceptoscope Film)
Second Character = Mode
Third Character = Device Number (1, 2, 3, etc.)

Field No. 2. Time Per Frame or Film Speed

Three characters specify time in seconds and tenths of seconds (59.9 seconds maximum) per frame, or two-digit speed in frames per second. The first character is zero when the speed is specified in frames per second.

Field No. 3. Front Film Start Location

A three-digit number (999, maximum) which specifies the front film cue mark number at which the sequence starts.

Field No. 4. Front Film Stop Location

A three-digit number which specifies the front film cue mark number at which the sequence stops.

Field No. 5. Rear Film Start Location

A three-digit number which specifies the rear film cue mark number at which the sequence starts.

Field No. 6. Rear Film Stop Location

A three-digit number which specifies the rear film cue mark number at which the sequence stops.

The main controller 10 will be used to control a perceptoscope subcontroller as illustrated generally in FIG. 10. It should be obvious that the techniques used in the two subcontrollers already discussed, namely the slide projector subcontroller and the tape recorder or movie projector subcontroller, be adapted to the perceptoscope subcontroller. That is, when the film is stepped, operation will be essentially that of a slide projector subcontroller (FIG. 6). When the film is in continuous motion, operation will be essentially that of a movie projector subcontroller (FIG. 7). When the film is fixed, operation will be in a simple on/off mode with only a single address indicated, which one of the films will be directed to. The mode control 330 will provide control of these functions.

More specifically, FIG. 10 illustrates the general function which the perceptoscope subcontroller will provide. Each one of these functions is illustrated as a control box 332, 334, 336, and 338. Connected to each one of these control functions is the data input, shown as double lines, from main controller 10. Each control function is enabled to receive this data as controlled by the position pulses and device class level shown generally as the enable input.

Both front film address control 338 and rear film address control 336 will include essentially the same logic. This logic will provide the capability for continuous film motion, stepped film motion, on/off single address motion, and stepped film motion in response to the other film cue or address marks. The logic will comprise essentially a combination of the logic shown for the slide and movie projector subcontrollers. The film cue mark count will provide an alternate capability of incrementing the film in ORed combination with the time comparator 112 of FIG. 7. The actual operation will be controlled by the mode control 330 whose output control signals will provide the proper timing and set and reset signals to control flip-flops and gates in the logic of controls 336 and 338. That is, the mode data will cause the mode control to decode and steer the proper control signals to the respective logic controls 336 and 338 so that the front and rear films will be either stepped, moved continuously, fixed at an address specified, or stepped in response to the address of the other film.

The speed control 334 will also be further controlled by mode control 330. That is, the speed data in the instruction word will be steered to control either the front film or rear film for continuous or stepped motion.

Mode control 330 will also enable the lamp control for both lamps in perceptoscope 342. Usually the lamps will remain on until the stop address of both films is reached.

Thus we have shown that the apparatus of the invention can not only control the operation of remotely controllable slide projectors, recorders or movie projectors, but also can control such more complicated devices such as a perceptoscope utilizing the principles of operation discussed for the former devices. Also, it should be appreciated that the apparatus of the invention might be used for control of other electromechanical devices. Such other devices might include a combination of valves or controls used to automatically produce a product. The apparatus of the invention might be so adapted and if so would provide for greater versatility of control than has been seen in the prior art.

Another device which the apparatus of the invention may control is an x–y positioning table or an x–y recording mechanism whether such mechanism be a print-type device or a CRT display. A typical instruction is illustrated in FIG. 11. Position 1 of Field 1 would indicate the device class (example X for x–y recorder), position two might indicate forward or reverse operation, position three would indicate the device number of the device class selected. Position two, however, might more favorably control the blank/unblank of the recording media; that is, the stylus, etc. might be up or down, down being the write or unblank mode. Field two would be used to indicate the speed (example 7 ½ per second). Fields 3 and 4 would designate the X axis start and stop addresses respectively while Fields 5 and 6 would designate the Y axis start and stop addresses respectively. It should be realized that changes in this field selection could be made without departing from the scope of the invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. Apparatus for controlling the operation of electromechanical devices, said apparatus comprising:

A. a main controller;

B. means including a memory for providing instructions to said main controller, each instruction word comprising a plurality of characters including a subcontroller selection character and an execute character, said memory further storing text associated with said instruction words;

C. a first subcontroller comprised of input registers controllably coupled to said main controller, said first subcontroller coupled to control inputs of said electromechanical device;

D. means for activating said first subcontroller in response to the subcontroller selection character of a first one of the instruction words;

E. means for storing said characters in said first instruction word in said first subcontroller input registers; and F. means, in said first subcontroller, for executing said first instruction word stored in said input registers of said first subcontroller in response to said execute character, thereby controlling the operation of an electromechanical device.

2. Apparatus as defined in claim 1 wherein:

A. said main controller includes means for producing position signals corresponding to the position of said characters in said first instruction word; and wherein B. said means for storing said first instruction word characters in said first subcontroller input registers is responsive to said position signals.

3. Apparatus as defined in claim 2 wherein said means for executing said first instruction word comprises:

A. a first input register for storing the characters of said instruction word indicating the operation start address of said electromechanical device;

B. a second input register for storing the characters of said first instruction word indicating the operation stop address of said electromechanical device; and C. a third input register for storing the characters of said first instruction word indicating the time of operation for each address between and including said start and stop addresses of said electromechanical device;

D. means for activating said electromechanical device at each of said addresses for the time of operation indicated in said third input register.

4. Apparatus as defined in claim 3 wherein said means for activating said electromechanical device includes:

A. first counting means coupled to said start address input register, said first counting means being incremented to said start address;

B. means coupled to said first counting means for positioning said electromechanical device at said start address;

C. first means coupled to said first counting means and said stop address input register for comparing the address contained in said first counting means and the address contained in said stop address input register;

D. means, coupled to said first comparing means, for incrementing said first counting means one address position after electromechanical device is activated for said time of operation indicated when there is no comparison in said first comparing means; and E. means, coupled to said first comparing means, for deactivating said first subcontroller when there is a comparison in said first comparing means.

5. Apparatus as defined in claim 4 wherein said means for activating said electromechanical device further comprises:

A. means for generating a clock signal when said electromechanical device is positioned at the indicated address;

B. second means for counting the number of occurrences of said clock signal;

C. second means for comparing said number of occurrences of said clock signal with said characters indicating said time of operation in said third input register;

D. means for clearing said second means for counting when there is a comparison in said second means for comparing; and E. means for incrementing the address of said first counting means when 1. there is a comparison in said second means for comparing, and 2. there is no comparison in said first means for comparing.

6. Apparatus as defined in claim 5 wherein said electromechanical device is a tape recorder.

7. Apparatus as defined in claim 5 wherein said first subcontroller further includes A. means for turning on a light source in said electromechanical device when 1. there is no comparison in said second comparing means, and 2. said electromechanical device is positioned at an address indicated by said first counting means; and B. means for turning off said light source in said electromechanical device when 1. there is a comparison in said first comparing means, and 2. there is a comparison in said second comparing means.

8. Apparatus as defined in claim 7 wherein said electromechanical device is a slide projector.

9. Apparatus as defined in claim 7 wherein said electromechanical device is a movie projector.

10. Apparatus as defined in claim 7 wherein said electromechanical device is a perceptoscope.

11. Apparatus as defined in claim 1,

A. wherein said memory is a recirculating memory; and

B. wherein display apparatus is coupled to said recirculating memory for display of said instruction words and said text associated with said instruction words as selected by special control characters of said instruction word, said display being blanked in response to a first voltage level from said main controller and said display being unblanked in response to a second voltage level from said main controller.

12. Apparatus as defined in claim 11 further including:

A. means, in said main controller, responsive to said special control characters for producing first and second voltage levels for respectively blanking and unblanking said display;

B. means responsive to a first special control character for producing said first voltage level blanking said display for all characters appearing after said first special control character; and C. means responsive to a second special control character for producing said second voltage level unblanking said display for all characters appearing after said second special control character.

13. Apparatus as defined in claim 12, further including means responsive to a third special control character for producing said second voltage level while said instruction word is executed by said means for executing, thereby unblanking said display during the time said first subcontroller is activated.

14. Apparatus as defined in claim 11 wherein said display apparatus further includes a keyboard interacting with said display in said display apparatus to provide editing capability of said instruction words and said text associated with said instruction words.

15. Apparatus as defined in claim 1 further comprising:

A. a second subcontroller comprised of input registers controllably coupled to said main controller;

B. means for activating said second subcontroller in response to a subcontroller selection character in a second one of said instruction words; and C. means for delaying execution of said means for executing in said first subcontroller until a delay execution character in said second instruction word is detected by said first and second subcontrollers, thereby controlling the simultaneous operation of two electromechanical devices.

16. Apparatus as defined in claim 1 wherein said means for executing said first instruction word comprises:
A. a first input register for storing the characters of said first instruction word indicating the operation start address of said electromechanical device;
B. a second input register for storing the characters of said first instruction word indicating the operation stop address of said electromechanical device;
C. a third input register for storing the characters of said first instruction word indicating the speed of operation of said electromechanical device; and
D. means for activating said electromechanical device at the speed selected between said start and stop addresses.

17. Apparatus as defined in claim 16 wherein said means for activating said electromechanical device includes:
A. means coupled to said first input register for positioning said electromechanical device at said start address;
B. means for detecting the present address of said electromechanical device;
C. means for comparing said detected present address and said stop address in said second input register and deactivating said electromechanical device when there is a comparison.

18. Apparatus as defined in claim 17 wherein said activating means further includes a light source, said light source:
A. being turned on when said electromechanical device is activated; and
B. being turned off when there is a comparison in said means for comparing.

19. Apparatus as defined in claim 17 wherein said means for executing said first instruction word further comprises:
A. a fourth input register for storing the characters of said first instruction word indicating the operation track number of said electromechanical device; and
B. means coupled to said fourth input register for positioning said electromechanical device for operation on the track number indicated by said fourth input register.

20. Apparatus as defined in claim 1 wherein said first instruction word in comprised of a plurality of fields wherein which said plurality of characters is included.

21. Apparatus as defined in claim 20 wherein said fields include characters indicating:
A. the operation start address of said electromechanical device;
B. the operation stop address of said electromechanical device;
C. the subcontroller to be activated; and
D. the electromechanical device to be activated.

22. Apparatus as defined in claim 21 wherein said fields further include characters indicating speed of operation of said electromechanical device.

23. Apparatus as defined in claim 21 wherein said fields further include characters indicating time for operation of said electromechanical device.

24. Apparatus as defined in claim 21 wherein said fields further include characters indicating operation track number of said electromechanical device.

25. Apparatus as defined in claim 21 wherein said fields further include characters indicating direction of operation of said electromechanical device.

26. Apparatus as defined in claim 21 wherein said fields further include characters indicating a first axis start and stop address and a second axis start and stop address of said electromechanical device.

27. Apparatus as defined in claim 26 wherein said electromechanical device is an X–Y positioning device.

28. Apparatus for controlling the operation of electromechanical devices, said apparatus comprising:
A. a recirculating memory wherein which are stored instruction words and text associated with said instruction words each of said instruction words including a plurality of fields, each of said fields including a plurality of characters;
B. a main controller;
C. means for activating said main controller in response to an instruction word;
D. a first subcontroller comprised of input registers controllably coupled to said main controller;
E. means for activating said first subcontroller in response to a subcontroller selection character in said instruction word;
F. means responsive to said instruction word fields for storing said instruction word characters in said first subcontroller input registers;
G. means, in said first subcontroller, for executing said instruction word stored in said input registers of said first subcontroller in response to an execute character in said instruction word, thereby controlling the operation of an electromechanical device; and
H. a display apparatus coupled to said recirculating memory for display of said instruction words and said text associated with said instruction words as selected by special control characters of said instruction word.

29. Apparatus as defined in claim 28 wherein said means for executing said instruction word comprises:
A. a first input register for storing the characters of said instruction word indicating the operation start address of said electromechanical device;
B. a second input register for storing the characters of said instruction word indicating the operation stop address of said electromechanical device; and
C. a third input register for storing the characters of said instruction word indicating the time of operation for each address between and including said start and stop addresses of said electromechanical device;
2. means for activating said electromechanical device at each of said addresses for the time of operation indicated in said third input register.

30. Apparatus as defined in claim 29, further including:
A. means, in said main controller, responsive to said special control characters for producing first and second voltage levels for respectively blanking and unblanking said display;
B. means responsive to a first special control character for producing said first voltage level blanking said display for all characters appearing after said first special control character;
C. means responsive to a second special control character for producing said second voltage level unblanking said display for all characters appearing after said second special control character; and
3. means responsive to a third special control character for producing said second voltage level while said instruction word is executed by means for executing, thereby unblanking said display during the time said first subcontroller is activated.

31. Apparatus as defined in claim 30, further comprising:
A. a second subcontroller comprised of input registers controllably coupled to said main controller;
B. means for activating said second subcontroller in response to a subcontroller selection character in a second instruction word; and
C. means for delaying execution of said means for executing in said first subcontroller until a delay execution character in said second instruction word is detected by said first and second subcontrollers, thereby controlling the simultaneous operation of two electromechanical devices.

32. Apparatus for controlling the operation of a random access, remotely programmable slide projector in response to an instruction word, said instruction word comprising a plurality of characters, said apparatus comprising:
A. a main controller;
B. a slide projector subcontroller, said subcontroller including input registers coupled to said main controller wherein
1. a first input register stores characters indicating the start address of said projector, 2. a second input register stores characters indicating the stop address of said projector, and
3. a third input register stores characters indicating the time of operation for each address between and including said start and stop addresses of said projector;

C. means for activating said main controller and said subcontroller in response to said instruction word, thereby storing said characters in said respective input registers; and D. means, in said subcontroller, for activating said projector and for executing said instruction word stored in said subcontroller input registers in response to an execute character in said instruction word, wherein said means for activating includes:

1. first counting means coupled to said start address input register; said first counting means being incremented to said start address;
2. means coupled to said first counting means for positioning said projector at said start address;
3. first means coupled to said first counting means and stop address input register for comparing the address contained in said first counting means and the address contained in said stop address input register;
4. means, coupled to said first comparing means, for incrementing said first counting means one address position after said projector is activated for said time of operation indicated when there is no comparison in said comparing means; and
5. means, coupled to said first comparing means, for deactivating said first subcontroller when there is a comparison in said first comparing means.

33. Apparatus as defined in claim 32 wherein said means for activating said slide projector further comprises:

A. means for generating a clock signal when said slide projector is positioned at the indicated address;

B. second means for counting the number of occurrences of said clock signal;

C. second means for comparing said number of occurrences of said clock signal with said characters indicating said time of operation in said third input register;

D. means for clearing said second means for counting when there is a comparison in said second means for comparing; and E. means for incrementing the address of said first counting means when 1. there is a comparison in said second means for comparing, and
2. there is no comparison in said first means for comparing.

34. Apparatus as defined in claim 33 wherein said first subcontroller further includes:

A. means for turning on a light source in said slide projector when 1. there is no comparison in said second comparing means, and
2. said slide projector is positioned at an address indicated by said first counting means; and B. means for turning off said light source in said slide projector when 1. there is a comparison in said first comparing means, and
2. there is a comparison in said second comparing means.

35. Apparatus as defined in claim 32, further including:

A. a recirculating memory coupled to said main controller activating means wherein said instruction word, text associated with said instruction word, and additional instruction words and associated text are stored; and B. a display apparatus coupled to said recirculating memory for display of said instruction words and said text associated with said instruction words as selected by special control characters of said instruction words.